United States Patent [19]

Drum et al.

[11] 4,404,180

[45] * Sep. 13, 1983

[54] MANUFACTURE OF HYDROGEN SULFIDE

[75] Inventors: Ian Drum, Calgary, Canada; Richard S. Madenburg, Boise, Id.; Douglas M. Paulsrude, Eugene, Oreg.; Carroll H. Sherman, Monaca, Pa.; Frank G. Turpin, Boise, Id.; Gerry A. Wheatcroft, Calgary, Canada

[73] Assignees: Home Oil Company Limited, Calgary, Canada; Morrison-Knudsen Company, Inc., Boise, Id.

[*] Notice: The portion of the term of this patent subsequent to Jun. 1, 1999, has been disclaimed.

[21] Appl. No.: 292,360

[22] Filed: Aug. 13, 1981

Related U.S. Application Data

[63] Continuation-in-part of Ser. No. 179,528, Aug. 19, 1980, Pat. No. 4,332,774.

[51] Int. Cl.³ .................. C01B 17/16; C22B 17/00; C22B 21/00; C01G 9/00
[52] U.S. Cl. .................................... 423/563; 423/564; 423/565; 423/DIG. 5; 422/109; 422/111; 422/160; 422/235
[58] Field of Search ............... 422/111, 109, 108, 160, 422/161, 235; 423/563, 564, 565, DIG. 5

[56] References Cited

U.S. PATENT DOCUMENTS

| | | | |
|---|---|---|---|
| 2,214,859 | 9/1940 | Maude et al. | 423/565 |
| 2,474,066 | 6/1949 | Preisman | 423/564 |
| 2,876,071 | 3/1959 | Updegraff | 423/563 |
| 3,312,529 | 4/1967 | Evano | 423/DIG. 5 |
| 3,506,715 | 4/1970 | Clark | 422/109 |
| 3,961,035 | 6/1976 | Mickley | 423/564 |
| 4,059,745 | 11/1977 | Gaertner | 423/DIG. 5 |
| 4,094,961 | 6/1978 | Beavon | 423/564 |
| 4,100,266 | 7/1978 | Smith | 423/DIG. 5 |
| 4,213,955 | 7/1980 | Cascianl et al. | 423/DIG. 5 |
| 4,290,110 | 9/1981 | Makovec | 422/111 |
| 4,332,774 | 6/1982 | Drum et al. | 423/DIG. 5 |

OTHER PUBLICATIONS

Fanelli, Rocco Solubility of Hydrogen Sulfide in Sulfur HEC, vol. 41, #9, pp. 2031-2033, Sep. 49.
Fanelli, Rocco Modifying the Viscosity of Sulfur HEC, vol. 38, #1, pp. 39-43, Jan. 46.
Wherry et al., Guide to Profitable Computer Control Hydrocarbon Processing, Gulf Publishing Co., 1968, pp. 69-72.

Primary Examiner—Gary P. Straub
Attorney, Agent, or Firm—Shanley, O'Neil and Baker

[57] ABSTRACT

Methods and apparatus adaptable to continuous production of hydrogen sulfide by chemical reaction of sulfur with a gaseous sulfur-reducing reactant selected from methane or other hydrocarbons, hydrogen, carbon-containing compounds such as carbon disulfide, gases with high CO contents, e.g. from gasification of coal, or mixtures of such gases are provided utilizing a separately-fired sulfur heater to vaporize liquid sulfur feedstock. Adding steam with the sulfur reduces the temperature level requirements of the sulfur vapors and provides $H_2$ and $O_2$ for the hydrolysis reactions. Control of the temperature of the sulfur vapors and steam delivered into the system through the sulfur vaporizer is used to modulate sulfiding reaction temperatures. A major portion of the steam is introduced with the sulfur vapors; a minor portion of the steam can be added with the feedstock reductant gas to assist in heat recovery from the reaction product gases and to facilitate standby conditions.

During production, the system is operated at pressures above atmospheric as determined by a back pressure established in removing product gases containing hydrogen sulfide. Controlled movement of reactants and reaction product gases through the system is achieved without requiring mechanical flow control equipment in any of the relatively high temperature zones approaching sulfiding reaction temperatures or sulfur vaporizing temperature.

Requirements for on-site storage of toxic and explosive hydrogen sulfide are eliminated. The separately-fired sulfur vaporizer provides for circulation of sulfur and/or steam, without feedstock reductant gas in various production standby modes, which make production on demand readily available.

8 Claims, 4 Drawing Figures

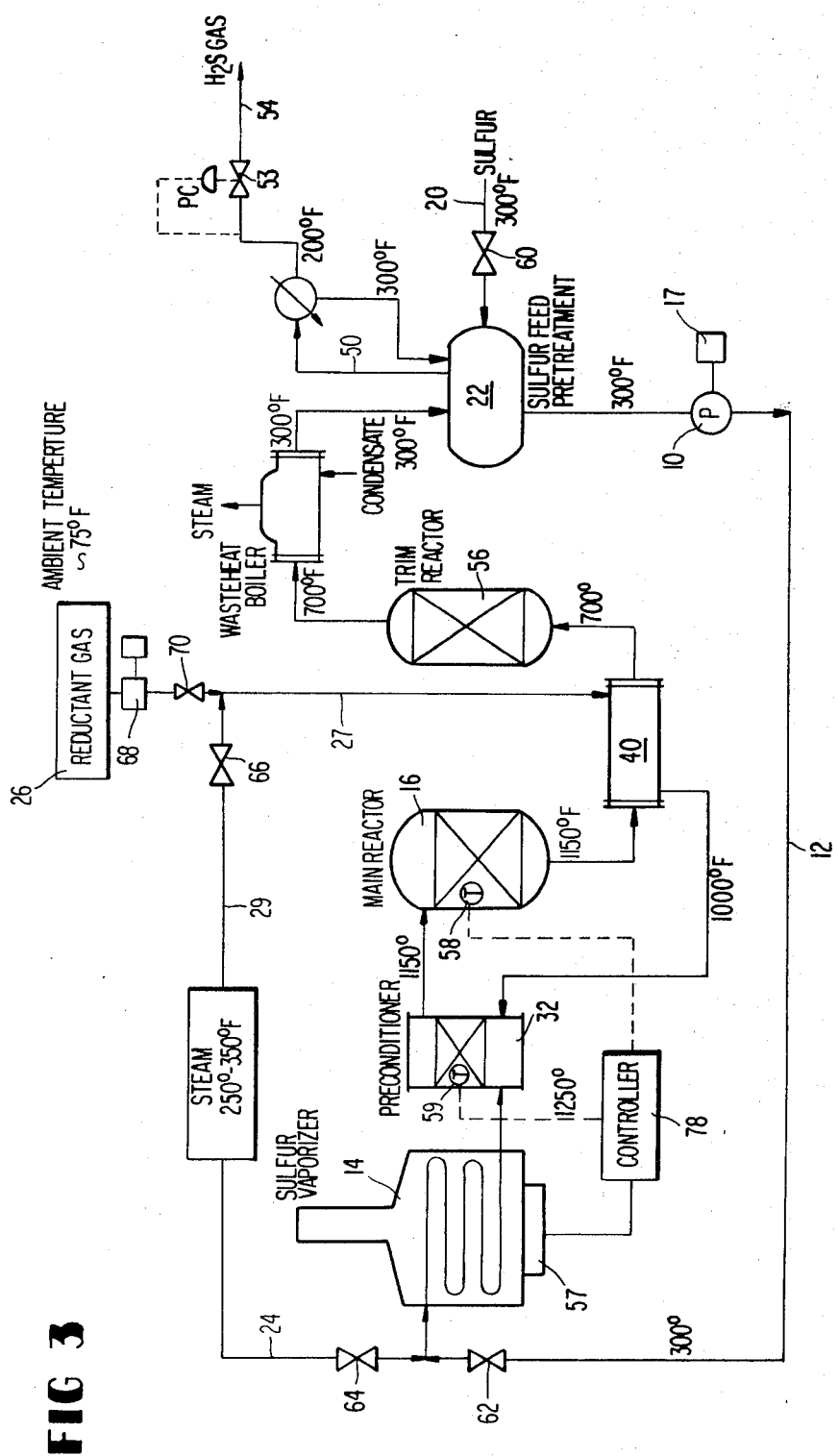

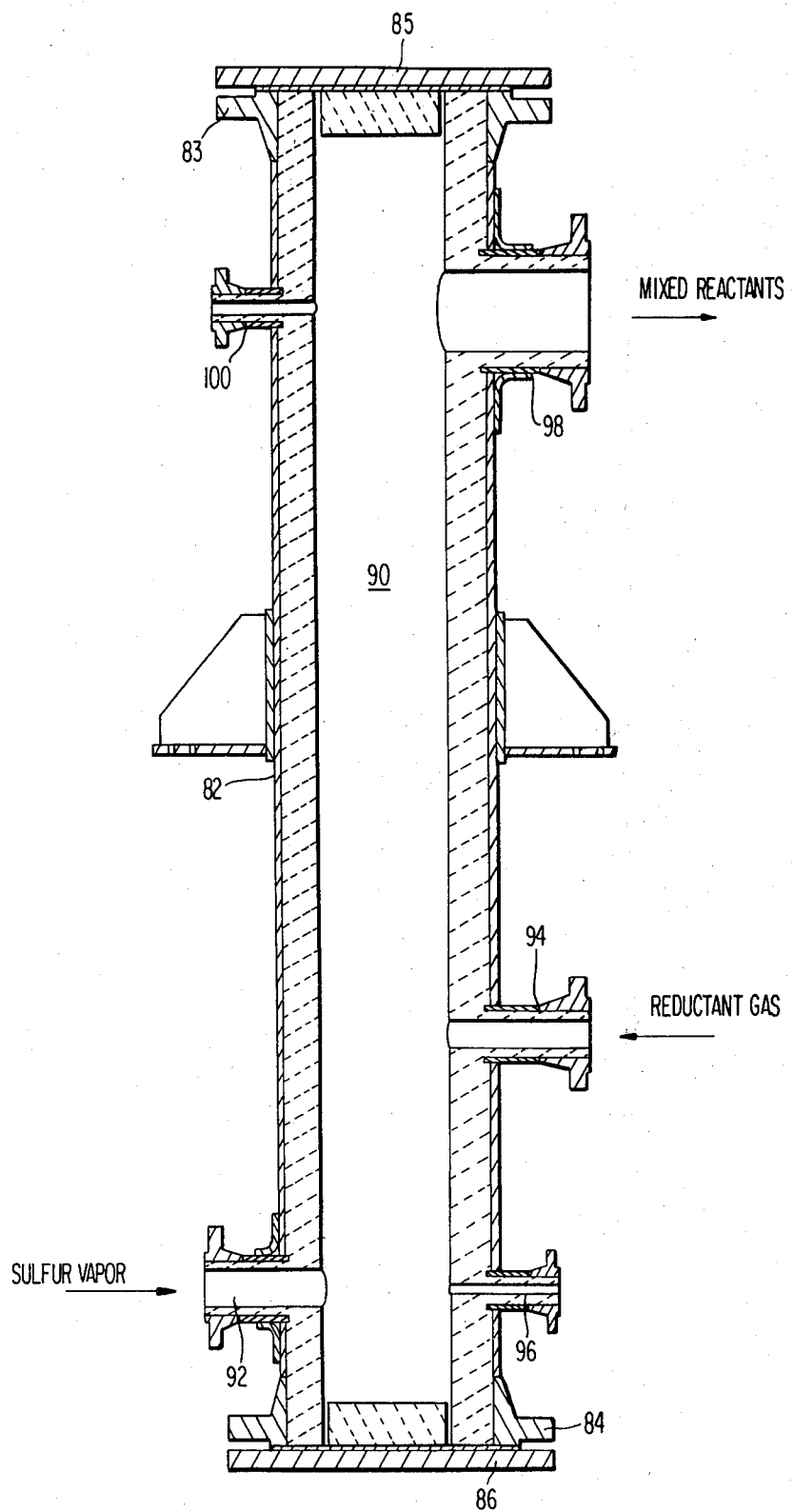

MANUFACTURE OF HYDROGEN SULFIDE

REFERENCE TO RELATED APPLICATIONS

This application is a continuation-in-part of application Ser. No. 179,528 filed Aug. 19, 1980, now U.S. Pat. No. 4,332,774.

This invention relates to manufacture of hydrogen sulfide. More particularly, this invention is concerned with processes and apparatus for control of hydrogen sulfide manufacture in a system adaptable to manufacture of hydrogen sulfide from various reductant gas feedstocks.

In addition to the long established uses of hydrogen sulfide in metallurgical operations and in the manufacture of chemicals, a growing demand for hydrogen sulfide has developed for use in removing sulfur dioxide from industrial waste gases such as the effluent from electrical utility installations which burn sulfur-containing fuels.

For commercial purposes, a locally available source of hydrogen sulfide is preferred for such waste-gas treatment uses. The present teachings facilitate manufature of hydrogen sulfide at a wide range of industrial plant sites by providing a system adaptable to efficient production of hydrogen sulfide from reductant gases of widely differing properties while readily maintaining positive process control and eliminating any requirement for on-site storage.

Hydrogen sulfide has been produced by bubbling hydrogen through liquid sulfur with sensible heat requirements being added at the reaction zone. Other processes limit reductant gases to those with levels of concentrations of carbon monoxide and/or hydrogen such that sufficient heat is generated to heat the reductant gas to reaction temperature. Such limitations on selection of reductant gases or the necessity of adding sensible heat for the sulfiding reaction by preheating the reductant gas are eliminated by the present invention.

A basic contribution of the invention is a system adaptable to sulfurization of various reductant feedstocks. Methane or other hydrocarbons, hydrogen, carbon disulfide, gases with high carbon monoxide contents such as those resulting from gasification of coal, or mixtures of these are examples of suitable gaseous reductants.

The optimum temperature for the sulfurization reaction is determined largely by the nature of the reductant gas selected or available on-site. Being required to add sensible heat for the sulfiding reaction by heating the reductant gas, as taught in some prior practice, presents a safety hazard and could cause operating difficulties, e.g. coking can occur when heating hydrocarbons significantly above 1000° F.

In accordance with the invention, sensible heat requirements of the system are provided through separately-fired means which facilitate process control. The feedstock reductant gas can be used for heat recovery purposes to improve process efficiency as part of the invention. But, neither the system requirements for sensible heat, nor control of heat input as taught, is placed on the feedstock reductant gas. Heat to initiate sulfurization of the feedstock reductant and/or to sustain such a reaction is supplied by superheating sulfur vapor and/or steam. An optimum sulfurization reaction temperature for a particular reductant gas is effectively and efficiently provided and controlled through such sulfur vaporizing heat-input means.

In providing for use of various reductant gases other than $H_2$ or $CO$, the invention preferably provides for modulation of the sulfurization reaction temperature by direct control of heat input. Quantitative control of liquid sulfur and steam introduced with liquid sulfur, as well as temperature control, are provided through the separately-fired sulfur vaporizer heating means. Methods and means are provided to facilitate mechanical flow rate control of liquid sulfur into such heating means.

Through use of such separately-fired heating means, the system can be maintained in operational standby condition for production of $H_2S$ on demand, thus eliminating requirements for storage of hydrogen sulfide.

In addition, equipment and maintenance problems inherent in attempting to control movement of reactants and reaction products when at or near the relatively high reaction temperatures or sulfur vapor temperatures are eliminated. The system is arranged so that valves and other such mechanical implementation are located only in relatively low temperature regions; this contributes to reliability and long service life while minimizing maintenance requirements without inhibiting process control.

Other advantages and contributions are considered in a more detailed description of the schematic presentations of hydrogen sulfide producing systems; in the accompanying drawings:

FIG. 3 is a schematic diagram of an embodiment of the invention showing location of valves and other mechanical flow control equipment, with representative temperatures encountered; and FIG. 4 is an elevational cross-sectional view of pre-conditioner apparatus forming part of the invention for mixing and filtering reactants.

Examples of the chemistry involved in typical sulfurization reactions for a number of reductant gases are as follows:

$$CH_4 + 4S \rightarrow 2H_2S + CS_2$$

$$C_3H_8 + 10S \rightarrow 4H_2S + 3CS_2$$

$$H_2 + S \rightarrow H_2S$$

$$CH_3OH + 3S \rightarrow 2H_2S + COS$$

$$CO + S \rightarrow COS$$

Acceptable sulfurization reaction temperatures for production of hydrogen sulfide can vary with properties of the reductant gas. A sulfurization temperature above 800° F. to about 1350° F. can be utilized.

A reaction temperature of about 1150° F. is representative for most natural gas. Heat to initiate and sustain such a reaction is provided by adding heat of vaporization to the sulfur before introducing the sulfur for reaction and, also, by superheating the sulfur vapor before the reaction. Controlling heat input to a sulfur vaporizer provides a direct and effective control not otherwise available in prior practice.

Selection of and dependability of sulfur flow are important aspects of the use of sulfur for adding heat to the system as required or modulating the temperature of the sulfurization reaction. Obstacles to achieving a desired mechanical flow control of sulfur are related to the known viscous effect brought about in raising the temperature of liquid sulfur above about 300° F. To overcome these obstacles, the cooled products of reaction are used to modify the liquid sulfur viscosity and facilitate pumping. Without such modification, the pressure differential encountered in heating liquid sulfur inhibits desired flow control of the liquid sulfur input. As previously known, when heating molten sulfur a sharp increase in viscosity is encountered near 315° F.; the viscosity rises rapidly to a peak of about 93,000 centipoises at about 370° F. That the viscosity decreases with further heating to the boiling temperature does not alleviate the problem in a continuous process where liquid sulfur flow control is utilized as in the invention.

Treating the liquid sulfur while at a relatively low temperature enables the heat input and controls taught to achieve smooth continuous operation. This modification of the effects of liquid sulfur viscosity is accomplished by keeping the liquid sulfur feedstock substantially saturated with dissolved hydrogen sulfide by controlling contact of the liquid sulfur feedstock with the cooled product gases. Part of the hydrogen sulfide dissolved in the liquid sulfur is obtained from condensation of the excess sulfur vapor in the reaction product gases since such condensate is generally saturated with hydrogen sulfide. The remaining hydrogen sulfide additions are brought about by direct adsorption of hydrogen sulfide gas; cooled product gas can be sparged through the liquid sulfur feedstock for these purposes. With these teachings, a positive displacement pump can be utilized to facilitate effective selection and adjustment of liquid sulfur feed.

Figure 1:
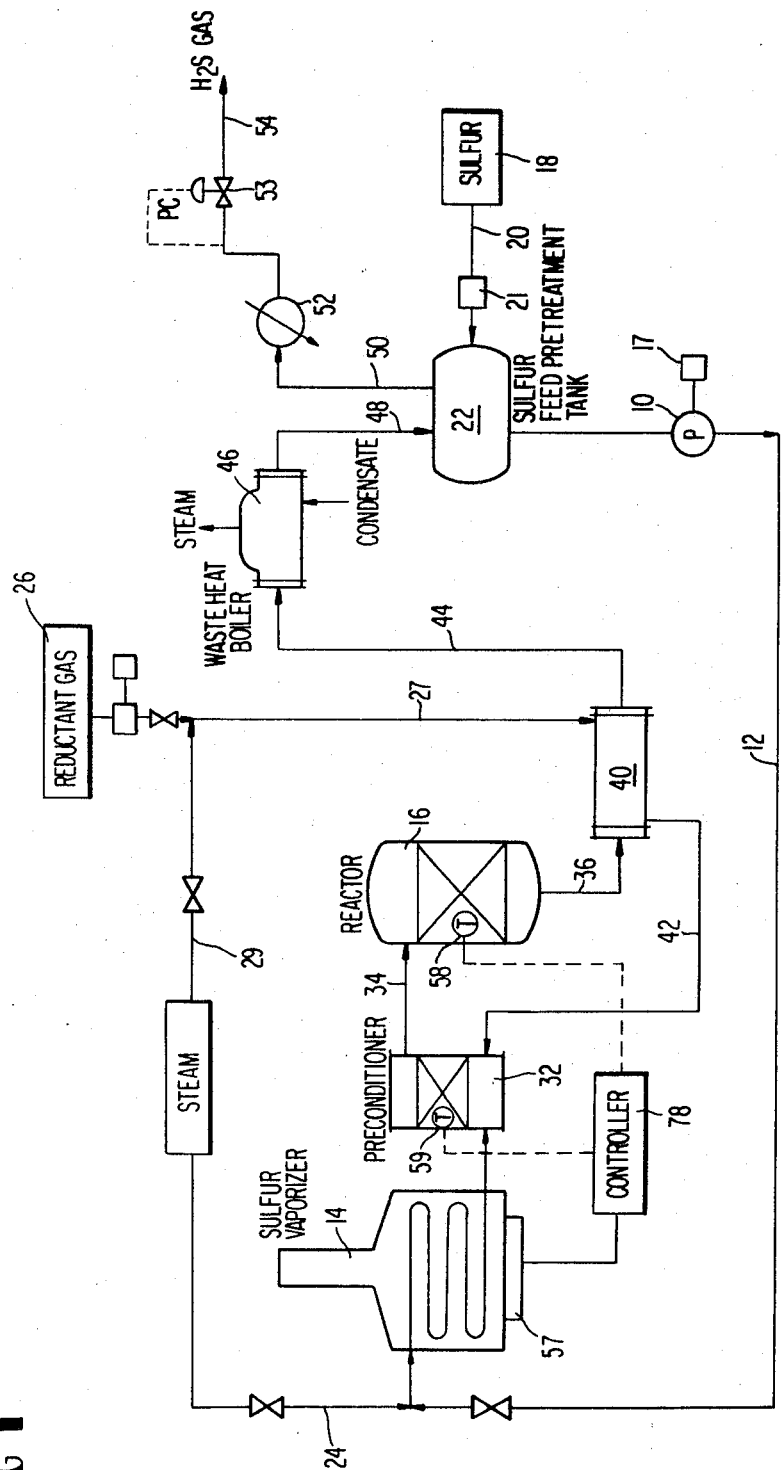
FIG. 1 is a schematic diagram of a hydrogen sulfide producing system embodying the invention utilizing a single reaction zone.
Figure 2:
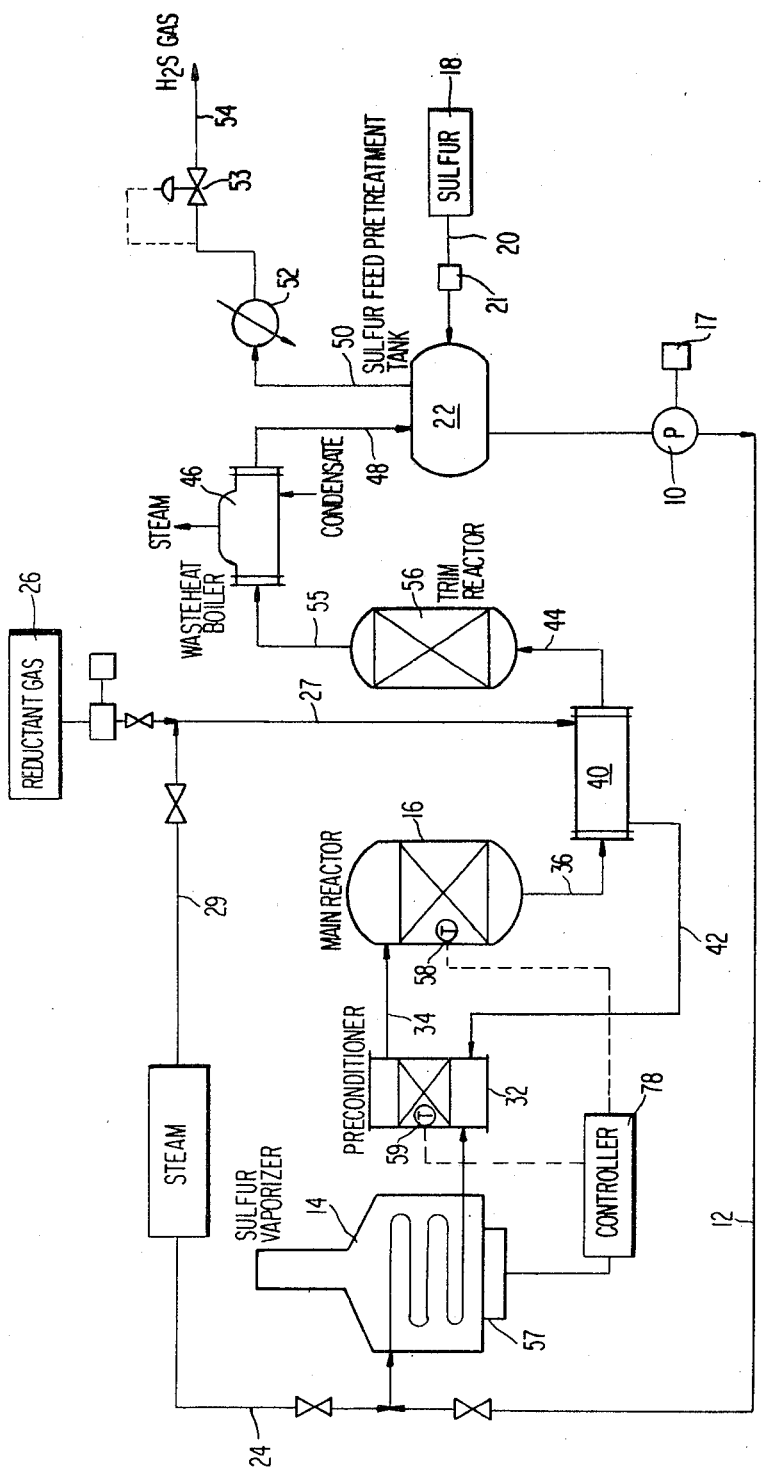
FIG. 2 is a schematic diagram of an embodiment of the invention utilizing multiple reaction zones operable at differing temperatures.

In FIGS. 1, 2 and 3, similarly functioning structures are identified by the same reference numerals. Liquid sulfur feedstock is delivered by sulfur feed pump 10 through conduit 12 to sulfur vaporizer 14. A sulfurization reaction is carried out in reactor 16 of these figures.

Sulfur feed pump 10 can include an adjustable feed stroke to control the flow of molten sulfur. The pumping rate can therefore be readily adjusted at selector 17 dependent on the hydrogen sulfide production rate and the amount of excess sulfur desired in the reactions. Facilitating liquid sulfur pumping rates is also important to providing the reaction temperature modulation desired. Sulfur vapor temperature and the amount of sulfur are interrelated for the latter purpose.

Liquid sulfur feed from source 18 is introduced through feed line 20. Filter 21 removes ash and other solid impurities which would tend to deposit out in the vaporizer or which could otherwise adversely affect operations.

The liquid sulfur is treated for viscosity control purposes in sulfur feed pretreatment tank 22. Saturating the liquid sulfur with hydrogen sulfide eliminates the rapid rise in viscosity encountered during transition temperatures above 300° F. in heating liquid sulfur to vaporizing temperature.

The sulfur vaporizer 14 is a fired process heater for boiling and superheating the sulfur. Direct control of superheat temperature is facilitated by control of combustible fuel input.

A large diameter heating coil is preferred to help compensate for internal build-up of metal sulfide scale. Also, the entrance portion of the coil can be designed for maximum heat transfer rate to help shorten heating time during which the rapid rise in viscosity and the obstructing effects of high viscosity would ordinarily be expected in the vaporizer.

The addition of steam from conduit 24 through the vaporizer 14 increases the adaptability of the system for production of $H_2S$ and enables establishment of standby conditions. Superheating the steam in vaporizer 14 provides additional heat for initiating and sustaining the sulfurization reactions and enables placing a reasonable limit on the upper temperature requirement of the sulfur within desired quantitative limitations placed on the use of excess sulfur; this in turn increases tube life in the vaporizer by decreasing the corrosive reaction of sulfur with the vaporizer tubes.

Vaporizer 14 provides for preheating of the system and the system can be purged with steam from vaporizer 14 before start-up eliminating the need for a nitrogen purge to remove oxygen from the system. Vaporizer 14 thus enables a hydrogen sulfide installation to be self-contained in the sense of eliminating any requirement for a separate steam producing means for start-up or otherwise since a steam producing coil can readily be added within the vaporizer heating chamber to provide a source of steam for the system. Also, as discussed in greater detail later, teachings of the invention including the use of the separately-fired sulfur vaporizer as a heat source enables the system to be kept in a standby condition with units of the system at or near operating temperature enabling hydrogen sulfide production to be initiated readily upon demand thus eliminating hazards inherent in storage of highly toxic and inflammable hydrogen sulfide.

The reductant gas is added from a source 26 through conduit 27. Provision is also made for addition of steam with the reductant gas through line 29. Steam additions for hydrolysis reaction purposes can be made with either the sulfur vapors or the reductant gas. When made with the reductant gas, steam addition can be utilized to moderate heat-up of the reductant gas feedstock as desired during production and provides steam flow through the reductant gas inlet means during standby condition. Preferably, a minor portion of the steam input to the system is made through the reductant gas feedstock inlet means.

Superheating of the sulfur vapor and steam is controlled in vaporizer 14 responsive to operating requirements in reactor 16. Superheating at pressure several times atmospheric is ordinarily used; lower pressure can improve conversion in lower temperature reactions.

System operating pressure is established by pressure control in the product gas removal conduit. The pressure of the reductant gas feedstock can influence selection of system operating pressure when the reductant gas at a particular site is available at a suitable operating pressure. The system operating pressure determines the pressure of sulfur vapors delivered by vaporizer 14. In general, the system is operated at pressures between about two and about five atmospheres.

In accordance with the invention, the reductant gas, sulfur vapor, and steam are mixed thoroughly in a preconditioner vessel 32. This vessel can function to filter entrained particulate, scale, carbon, and ash, prior to introduction of the mixed reactants through conduit 34 into the reactor vessel. The premixing of the reactants which can take place at widely differing temperature levels also reduces strain in the catalytic reaction zone and facilitates the reaction and its control. The filtering function of preconditioner vessel 32 helps in maintenance of a desired flow through the system both in production and standby modes.

Reactor 16 includes a reaction zone filled with a catalyst supported to allow desired contact and passage of reactants and reaction products. The reaction products are delivered over conduit 36 and passed in heat exchange relationship with the reductant gas being introduced to the process through heat recovery unit 40. Heat recovery aids efficiency. However, heating of any reductant gases to a temperature likely to cause coking is avoided and is not required since the heat input source for any sensible heat requirements for the system is at vaporizer 14. Conduit 42 conveys the reductant gas heated from heat recovery unit 40 into mixer 32.

In practice of the invention, sulfur vapor is introduced into the process in excess of that required stoichiometrically in order to insure maximum possible conversion of the reductant feedstock and to reduce or eliminate hydrogen in the product gases. Control of sulfur vapor and steam temperature delivered by the sulfur vaporizer along with quantitative control of sulfur feed and steam are used to modulate reaction temperatures so as to maintain such temperature within an optimum range. When reaction temperatures must be moderated, the extent of superheating sulfur and steam in vaporizer 14 is adjusted. The sulfur vapor can also be used to maintain desired reaction zone temperatures during process turndowns.

The present system is operable should relatively pure hydrogen be available at the site as the reductant gas. As shown in FIG. 1, the product gases from reactor 16 comprise hydrogen sulfide and excess sulfur in vapor form. In completing the process, the excess sulfur is removed from the product gases and the hydrogen sulfide is delivered for desired usage. Steam is made available when not required for reaction purposes because of its other process temperature moderation and system purging advantages.

Under such circumstances and when the conversion of the reductant gas is sufficient in the main reactor, without further reaction being required to produce acceptable product, the product gases can be directed to cooling means and then to the pretreatment tank 22.

In the embodiment of FIG. 1, waste heat boiler 46 is used to cook the product gases which can exit from recovery unit 40 at a temperature around 700° F.–900° F. Conduit 44 directs product gases to waste heat boiler 46 which reduces the temperature of the product gases to approximately 300° F. Condensed sulfur, which is likely to be saturated with hydrogen sulfide, can be directed into pretreatment tank 22 as previously described. For most steady state conditions, a temperature of about 300° F. is preferred for the liquid sulfur feedstock. The heat from condensation of sulfur vapor is used to generate steam in the waste heat boiler 46. Part of the heat recovered in heat recovery unit 40 can also be used to generate steam.

The reaction gas, containing hydrogen sulfide, passes through an internal mist separator in pretreatment tank 22 and hydrogen sulfide is delivered over conduit 50 for additional cooling (to about 200° F.) in product cooler 52 where sulfur vapor is removed. The hydrogen sulfide gas is delivered through pressure control valve 53 in conduit 54.

The adaptability of the present system is directed primarily to the use of reductant gases other than hydrogen which are more readily and economically available at most installations. Carbon containing reductants (e.g. paraffinic hydrocarbons) can form carbon-sulfur compounds, generally in excess of acceptable levels, in the main reactor 16. Hydrolysis of carbon-sulfur compounds is carried out in accordance with the following formulae:

$$CS_2 + 2H_2O \rightarrow 2H_2S + CO_2$$

$$COS + H_2O \rightarrow H_2S + CO_2$$

Steam additions are required for such hydrolysis reactions and steam is introduced with the sulfur vapor and/or the reductant gas reactant. As previously mentioned, adding steam via conduit 24 through vaporizer 14 has additional utility in providing an additional means for establishing and maintaining the desired temperature for the reaction in the reactor 16; a major portion, generally up to about 90%, of the steam addition is added in this way. Adding the remaining minor portion of steam additions through conduit 27 has an added benefit in controlling the temperature of the reductant gas feedstock.

The reactions can be regulated within the main reactor 16 with sulfurization and hydrolysis reactions occurring to produce satisfactory product for many uses in a single reaction zone (as in FIG. 1). However, for process adaptability and increased hydrogen sulfide conversion efficiency, a trim reactor 56, as shown in FIG. 2, is provided in the conduit between the heat recovery unit 40 and the waste heat boiler 46; conduit 58 connects trim reactor 56 to waste heat boiler 46.

Hydrolysis reactions can occur at temperatures as low as 500° F. In trim reactor 56 hydrolysis is carried out so that sulfur remains in the vapor state. The temperature is selected to accomplish the hydrolyzing reaction sufficiently above the dew point of the sulfur vapors.

The product gases from trim reactor 56 after hydrolyzing reactions include primarily hydrogen sulfide, excess sulfur vapor, excess water vapor, and $CO_2$. These are directed over conduit 55 to waste heat boiler 46. Cooling the product gases to 300° F. condenses sulfur vapors. Product gases and condensed sulfur are directed, as previously described, to pretreatment tank 22. After additional cooling in product gas cooler 52, the product gases can be treated further to produce substantially pure hydrogen sulfide.

The gas resulting from coal gasification comprises largely carbon monoxide and hydrogen; when this gas is used the sulfur vapors are only slightly superheated and are added in excess of requirements, typically at percentages of 100% above stoichiometry, or higher.

A control objective is to hold temperatures in the sulfurization reaction zone near the desired optimum. A reaction temperature is selected and the process regulated with the quantity of sulfur feed and the temperature of the vaporized sulfur and steam to hold reaction temperature within the desired temperature range. The reaction temperature is monitored and the heat input to vaporizer 14 can be controlled responsively to maintain sulfur vapors within an optimum temperature range.

In a control procedure utilizing simplified control implementation, the sulfur feed rate is set at a preselected level and the temperature of the vaporized sulfur and steam is controlled by operation of fuel burners for vaporizer heat source 57. When smooth operations have been established, with the reaction zone temperature in the optimum range, the sulfur vapor temperature is monitored and used to control combustible fuel input to the fuel burner. Monitoring sulfur vapor temperature for this purpose has the advantage of fast response. Reaction zone temperature, which has a slower time response because of the mass of materials involved, is indicated and recorded. Process control apparatus for more sophisticated automated control is readily available in the art and adaptable based on operational data.

The properties of sulfur enable it to exercise greater temperature control than steam so that a set rate of sulfur additions for full production may be held when operating at less than full production capacity. But there are practical limits on the amount of excess sulfur that should be added, as discussed above. Also, in order to avoid raising the vaporizer tube temperature to levels which are unduly detrimental to service life, steam can be added for temperature modulation purposes in addition to its function in hydrolysis reactions.

Typically, the reaction bed in the main reactor (16) is a catalyst material consisting of zirconium aggregate or activated alumina. A qualification on the type of activated alumina used in such primary reactor is that it have high crushing strength which will not degrade at the high temperatures which can be required. Activated alumina catalyst would typically be used in the trim reactor bed. The reactors are refractory lined to minimize heat loss through vessel shells.

Reaction zone temperatures are measured by temperature sensors such as 58 in reactor 16. Because of the response time lag mentioned, it is preferred to monitor the sulfur vapor temperatures at temperature sensor 59 in the premix and conditioning vessel 32.

As shown in FIG. 3, valving and other mechanical flow control implementation are located in relatively low temperature zones. Positive pressure flow is exercised in the high temperature areas without mechanical flow control implementation in such areas.

Flow control means can typically include pumps and valves. For example, in FIG. 3 valve 60 is located in sulfur feed line 20; valve 62 is located in the liquid sulfur feed line 12 between sulfur feed pump 10 and vaporizer 14; valve 64 is located in steam line 24 and valve 66 is located in steam line 29. Reductant gas is provided at available temperatures and pressures or, pump compressor 68 can provide desired pressure of 50–75 psig. Pressure control valve 70 located in reductant gas feed line 27 introduces reductant gas to the process at or above the system pressure established through pressure control valve 53 in product gas delivery conduit 54; a representative system pressure is 35 psig.

Reactants are fed into the system and reaction products fed through the system at pressures above atmospheric pressure as described above and temperatures shown in FIG. 3 while limiting mechanical implementation to relatively low temperature regions. The pressure at any given point is established by pressure loss through the system and the back pressure maintained by pressure control valve 53. Flow control between high temperature elements, e.g. from the mixer 32 to the reactor 16, is achieved without mechanical flow control implementation in such high temperature regions.

In a representative operation, liquid sulfur is delivered by controlling the feed stroke of sulfur feed pump 10. Sulfur vapor and steam temperature is monitored and controlled through heat input source 57 for sulfur vaporizer 14. Liquid sulfur and steam are delivered as required and sulfur vapor and steam temperature controlled to maintain the reaction zone temperature in reactor 16 within a desired range. The temperature sensor probe 59 in preconditioner 32 provides an input to controller 78 for burner control of heat input source 57. While liquid sulfur feed can be set manually by adjusting the feed stroke of pump 10, sulfur feed rate and sulfur vapor temperature can be integrated and automated. Such mechanical flow control implementation, sensors, and electronic processors are available commercially and their use in the light of the above teachings is within the skill of the art so that no further description of these devices is required for an understanding of the invention.

The temperatures shown in FIG. 3 for sulfur vapors, main reactor input and output, reductant gas temperature, and trim reactor temperatures are representative for a natural gas reductant and can vary when the system is adapted for other reductants. The relatively low temperatures shown at regions for mechanical flow control equipment are typical with other types of reductant gases.

Preconditioner mixer vessel 32 is shown in greater detail in FIG. 4. Vessel 32 comprises shell wall 82 with flanges 83, 84 at opposite longitudinal ends for attachment and removal of flanged access doors 85, 86. Refractories 88 line the shell and help define chamber 90 which, during usage, is filled with ceramic shapes (not shown).

Sulfur vapors or sulfur vapors and steam are introduced at entry port 92 and reductant gases at entry port 94. The temperature probe for monitoring sulfur vapor temperature can be mounted through port 96.

The ceramic shapes in chamber 90 help absorb the thermal shock of mixing vapors from vaporizer 14 and reducing gas, which reactants can be introduced at widely differing temperatures. The ceramic shapes also insure complete mixing of the reactants during upward passage and help remove particulates such as metal sulfides and thereby increase the service life of the catalytic reaction zone and catalyst bed. The ceramic shapes can be readily removed and replaced through the access doors 85, 86.

Mixed reactants are delivered through exit port 98. A temperature probe can be mounted in port 100 to monitor the temperature of the mixed reactants.

The main reactor 16, in which a sulfurization reaction takes place, is preferably designed with a large diameter catalyst bed to reduce pressure drop. Catalyst is supported in the reaction zone by ceramic shapes. Refractory thickness for both reactors and preconditioner vessel is selected to hold shell temperature to approximately 300° F. to minimize moisture condensation and maintain shell strength.

The heat recovery unit 40 which removes heat from the gases discharging from the main reactor by preheating reductant gas, or reductant gas and steam, can be designed as a single pass shell and tube arrangement with hot reactor gases on the tube side. Piping and connections are refractory lined. Sufficient heat transfer surface is provided to cool the gases discharging from the main reactor to temperatures desired in the trim reactor. Any sulfur vapor condensate can be removed in a sulfur dropout leg to minimize clogging problems in the remainder of the system.

The trim reactor vessel, which can be used to increase conversion to hydrogen sulfide by hydrolysis reactions, is refractory lined and typically contains an activated alumina catalyst. The trim reactor is generally operated at about 700° F.-900° F. with refractory linings controlling heat losses.

In a low capacity embodiment, e.g. one hundred lbs/hr $H_2S$, natural gas and steam were reacted with vaporized elemental sulfur in a catalyst bed containing 3 cubic feet of 4 to 10 mesh zirconium aggregate. The reaction temperature was maintained at about 1050° F. by using 110 to 300 percent of stoichiometric sulfur requirement. To minimize formation of carbonyl sulfide, 25 percent excess steam was provided. Sulfur vapor and reductant gas were provided for operations at about thirty (30) psig outlet pressure. The composition of the natural gas was approximately 92 percent methane and 6 percent heavier hydrocarbons. The natural gas flow rate was 3.96 SCFM and the combined reactants provided a space velocity of 470 hour$^{-1}$ with a residence time of 2.3 seconds. The excess sulfur in the reactor product gas was removed by condensation and the analysis on a dry mole basis was 78 percent $H_2S$, 18 percent $CO_2$, 1.5 percent COS and 0.6 percent $CH_4$. The balance in the gas analysis was primarily $N_2$ (from the natural gas) with trace amounts of $CS_2$ and CO. Process conditions in the reactor permitted the sulfurization and hydrolysis reactions to occur in the same catalyst bed.

The reactor product gas from the first example was cooled and condensed sulfur removed. The gas was then passed into a trim reactor containing 2.5 cubic feet of activated alumina in the form of ¼ inch spheres. This provided a space velocity of 500 hour$^{-1}$ and a residence time of 3.95 seconds. The trim reactor product gas had a composition on dry mole basis of 79 percent $H_2S$, 19 percent $CO_2$, 0.4 percent COS, and 0.6 percent $CH_4$. The use of a trim reactor demonstrates that the COS content can be reduced by further hydrolysis to hydrogen sulfide at temperatures lower than the initial sulfurization reactions.

Using the same reactor described in the first example, the use of propane, methanol, and carbon monoxide reductant gases was demonstrated. Steam was added to the reductant gas prior to entering the reactor so that hydrolysis also occurred in a single catalyst bed. Sulfur was provided at about 300 percent excess in the reactions for propane and for methanol, and at about 700 percent excess for the reaction with carbon monoxide. The steam rate was at 50 percent excess for carbon monoxide. The following table summarized operation and results:

| Reductant Gas | Main Reactor Temp. °F. in | Out | Dry Product Analysis, % $H_2S$ | $CO_2$ | COS | $CS_2$ |
|---|---|---|---|---|---|---|
| Propane | 1,080 | 1,030 | 76.1 | 20.2 | 1.7 | 1.4 |
| Methanol | 1,100 | 1,100 | 74.2 | 21.6 | 2.6 | 0 |
| Carbon Monoxide | 1,000 | 1,050 | 50.1 | 46.8 | 2.2 | 0 |

FIG. 3 sets forth typical operating temperatures and constituents at several points within the system. In a typical embodiment using methane as the reductant gas, molten sulfur at about 20% in excess of stoichiometric requirements is mechanically pumped by sulfur feed pump 10 from the sulfur feed pretreatment vessel 22 to the sulfur vaporizer 14. Concurrently, steam from source 110 (which can be generated by the system as described earlier) is provided with about 80% of the steam being co-injected with the molten sulfur to the sulfur vaporizer 14 and blended with the molten sulfur and the balance being blended with the reductant gas.

Steam is introduced with the molten sulfur to the sulfur vaporizer 14 for reduction of sulfidation corrosion of the sulfur vaporizer heat transfer surface, plus lowering of the partial pressures of the steam/sulfur mixture, thereby allowing the subsequent process reactions to take place at a lower threshold temperature. The mixture of sulfur and steam is superheated to approximately 1250° F. and discharged to the preconditioner vessel 32 to which the reductant gas methane from source 26 and additional steam are added. The mixture of superheated sulfur, steam, and reductant vapor is directed into the main reactor 16 which contains a zirconium catalyst for catalytic conversion to $H_2S$. The product gases from reactor 16, containing $H_2S$, unreacted sulfur and sulfur compounds, are discharged to heat exchanger 40. The methane and steam added with the methane provide for heat energy recovery in unit 40 and the temperature of product gas from main reactor 16 is reduced to about 700° F. to facilitate the further conversion of sulfur/carbon compounds to $H_2S$ in the presence of an alumina catalyst in the trim reactor 56.

Product $H_2S$ gas at about 700° F. is discharged to the waste heat boiler 46 for energy recovery. Cooled $H_2S$ product gas at about 300° F. is then discharged into the sulfur feed pretreatment vessel 22 for pretreating (viscosity modification) of the molten sulfur feed. $H_2S$ product is then discharged through a final product cooler for condensation of elemental sulfur carryover from the $H_2S$ product gas. Specific values are set forth in Tables I and II below for a higher capacity embodiment, e.g. 3100 lbs/hr of $H_2S$:

TABLE I

| Methane Feedstock and Steam | | | | | | |
|---|---|---|---|---|---|---|
| Fresh Sulfur | Sulfur Feed | Steam Feed | Natural Gas | Main Reactor | Trim Reactor | Cooled Reactor |
| Feed Rates in #/hr. | | | | Flow Rates in #/hr. | | |
| 2925.4 | 3510.4 | 1287.9 | 426.2 | 5224.6 | 5224.6 | 4639.5 |
| Temperature °F. | | | | | | |
| 300° | 300° | 350° | 50° | 1150° | 300° | 200° |
| Pressure (psig) | | | | | | |
| 45 | 75 | 55 | 55 | 45 | 35 | 30 |

TABLE II

| Component Values* under Operating Conditions of Table I | | | |
|---|---|---|---|
| Component | Main Reactor | Trim Reactor | Cooled Product |
| $H_2S$ | 84.53 | 90.38 | 90.38 |
| $CO_2$ | 18.66 | 22.71 | 22.71 |
| COS | 2.83 | 0.58 | 0.58 |
| $CS_2$ | 1.90 | 0.10 | 0.10 |
| CO | 0.09 | 0.09 | 0.09 |
| $N_2$ | 0.30 | 0.30 | 0.30 |
| $H_2$ | 0.24 | 0.24 | 0.24 |
| $CH_4$ | 0.74 | 0.74 | 0.74 |
| $CH_3SH$ | 0.06 | 0.06 | 0.06 |
| $H_2O$ | 32.69 | 26.84 | 26.84 |

*Expressed in pound moles per hour.

Controlled production of hydrogen sulfide on demand is a distinct advantage in the adaptability of the present hydrogen sulfide producing system to various plant site needs. With the control of sensible heat input features of the present invention, the system with equipment such as reaction vessels, heat exchanges, pre-mixer vessel, and conduits, can be readily kept at or near a desired operating temperature in standby condition without producing hydrogen sulfide. By maintaining the system at or near operating temperature, hydrogen sulfide product gas can be readily produced on demand, and requirements for storage of hazardous hydrogen sulfide are eliminated.

Various standby modes with controlled temperature are available.

When shifting to standby condition, the reductant gas supply is interrupted by closing valve 70 (FIG. 3). A portion of the total steam requirements for the standby condition is directed through conduits 29 and 27 for introduction to preconditioning vessel 32 through the reductant gas feedstock path.

In any of the various standby modes available, sulfur should continue to be added to the system for completion of reaction of any of the feedstock reductant gas in the system; and, sulfur can continue for short periods thereafter for certain purposes; e.g. for short shutdowns and minimizing temperature changes. However, when reactions which produce hydrogen sulfide from the feedstock reductant gas in the system are completed, the product gas exhaust valve 53 can be closed dependent on the downstream process receiving the product gas. Sulfur and steam flow can continue for relatively short standby periods with sulfur circulation after interrupting feedstock reductant gas introduction being controlled in order to avoid condensation of sulfur, e.g. in trim reactor 56, should standby conditions at less than full operating temperature be desired. Use of both sulfur and steam is preferred since smoother transition from production to standby and vice-versa are more readily attained.

When standby operations are expected for one or two days, sulfur circulation through the system is preferably terminated by stopping pump 10 and increasing steam additions. Steam additions through vaporizer 14 without sulfur circulation are generally at least double the steam provided under operating conditions when it is desired to maintain the system in standby at approximately operating temperature. For example, when about 1500 pounds per hour of steam are being introduced during operating conditions, steam additions are increased to about 3000 to 4000 pounds per hour with most of such steam being introduced through the vaporizer during standby conditions. Sulfur and steam or steam alone are controlled both as to temperature and quantity so as to maintain the desired heat balance in the system; lower trim reactor (56) temperatures can be obtained by increasing the percentage of steam introduced through reductant feedstock line 27.

The high temperature steam follows the paths through the system followed by reactant and product gases under operating conditions. This steam can continue to the downstream process receiving the H$_2$S product gas if that process can accept the water volume; or, the steam is directed to a flare exhaust either at a point between the waste heat boiler 46 and vessel 22 or in the line to valve 53. When initiating standby, it is preferred to flare after vessel 22 until sulfur has been removed from the reactors and product portion of the system when circulation of sulfur is terminated. Generally, standby conditions are established at or near atmospheric pressure so that back pressure at valve 53 is not required.

When extended periods of standby conditions are expected, e.g. a month or more, the system temperature can be maintained below normal operating temperature to save fuel while avoiding complete cool-down of refractories and purging requirements of start-up. Sulfur can be used with the steam when reheating for resumption of production. For relatively short periods of standby condition, the system is kept at approximately operating temperature flowing sulfur and steam, and production is readily resumed by adding feedstock reductant gas. For intermediate periods of several days, the system can be kept near operating temperature with steam only and production resumed by recirculating sulfur and adding feedstock reductant gas.

Data are presented for four standby modes as follows:

A—Circulate sulfur and steam, trim reactor minimum temperature 730° F.
B—Circulate sulfur and steam, trim reactor minimum temperature 620° F.
C—Steam only, maintain process temperature for restart
D—Steam only, lower temperature, reheat before able to restart, trim reactor minimum temperature 300° F.

Referring to FIG. 3 for designated locations, the flow data presented in Table III below for modes A, B, C, and D are in pounds per hour.

TABLE III

| Mode | Sulfur Line 12 | Steam Line 24 | Steam Line 29,27 | Flare between WHB 26 and Sulfur Tank 22 | Flare Before Valve 53 |
|---|---|---|---|---|---|
| A | 2200 | 1040 | 260 | | 1300 |
| B | 600 | 1800 | 200 | | 2000 |
| C | (valve 62 closed) | 3150 | 350 | 3500 | |
| D | (valve 62 closed) | 1350 | 150 | 1500 | |

In addition to the elimination of safety hazards by being able to produce H$_2$S on demand, there are important advantages from an operational engineering point of view in the standby condition concept taught and the standby modes provided. One of these advantages is related to the substantial elimination of sulfur solidification in the lines and equipment. Problems associated with sulfur freeze, due to its insulating properties, are well known so that liquid sulfur tanks and lines are conventionally steam jacketed. Avoiding the possibility of sulfur freeze-up in other portions of the system is part of the standby modes taught.

In addition, thermal shock and moisture condensation which can be detrimental to refractories and shell jackets are substantially eliminated. This extends the useful life of sulfur vaporizer, reactors and other equipment. Further, the system can be held in standby condition for extended periods and returned to production in a matter of hours rather than days.

The separately-fired sulfur vaporizer for control of sulfur vapor and/or steam temperature contributes to the adaptability of the system to various plant site conditions and requirements. Should hydrogen become available as a reductant feedstock so that steam is not required for a hydrolysis reaction, the sulfur vapor and steam heater finds utility in start-up, in moderation of the sulfurization reaction temperature, and in standby condition. Further, the options on steam facilitate proper heat balance in the system; e.g. the trim reactor can be operated at a desired temperature level by removing heat from the product gases, and hazards associated with overheating certain reductant feedstocks are reduced by introducing steam with the reductant feedstock. When a reductant feedstock with a high percentage of CO is provided at a plant site, the availability of steam provides hydrogen for the hydrolysis reaction and oxygen for converting carbon monoxide to carbon dioxide.

Various process control parameters and values have been set forth to provide an understanding of the invention and control equipment described in disclosing the invention. However, in the light of the above teachings, other process control parameters and values and other flow control apparatus can be utilized by those skilled in the art to effect desired process control utilizing the novel concepts of the present invention. Therefore, for purposes of determining the scope of the present invention, reference should be made to the appended claims.

What is claimed is:

1. Method for operating hydrogen sulfide manufacturing apparatus to eliminate requirements for storage of hydrogen sulfide product gases by providing for production of hydrogen sulfide on demand, such hydrogen sulfide manufacturing apparatus including an interconnected system for combining sulfur, sulfur reductant feedstock and steam for reaction to produce hydrogen sulfide, a source of gaseous sulfur reductant feedstock having a predetermined temperature, means for introducing gaseous sulfur-reducing feedstock to such system including means for interrupting such introduction of sulfur-reducing feedstock, vaporizer and superheater means including separately controllable heat source means for vaporizing liquid sulfur and superheating such sulfur vapors, means for supplying liquid sulfur at a predetermined temperature, means for delivering such liquid sulfur into the vaporizer and superheater means, means for quantitatively controlling delivery of liquid sulfur to the vaporizer and superheater means, means for supplying steam at a predetermined temperature, means for controlling supply of steam to the hydrogen sulfide manufacturing system including means for introducing steam into the vaporizer and superheater means to be superheated and means for introducing steam through such means for introducing gaseous sulfur-reducing feedstock, reaction vessel means for reacting sulfur vapors with such sulfur-reducing feedstock and steam to produce product gases including hydrogen sulfide, and discharge means for the product gases including valve means for interrupting discharge of product gases, such method comprising the following steps for interrupting the production of hydrogen sulfide resulting from introduction of liquid sulfur, sulfur-reducing feedstock, and steam into such system and for placing the system in standby condition, interrupting input of such sulfur-reducing feedstock to such system, controllably continuing introduction of sulfur through such vaporizer and superheater at least until reductant feedstock has been removed from the system, controlling the separately controllable heat source means for the vaporizer and superheater means to maintain temperatures within such system at a level related to system temperatures maintained during production of hydrogen sulfide, and controllably continuing introduction of steam to such system with a major portion of the steam being introduced through such vaporizer and superheater means and a minor portion being introduced through such means for introducing sulfur-reducing feedstock to maintain a positive flow of steam to prevent back-flow of other gases being delivered by such vaporizer.

2. The method of claim 1 further including the step of interrupting discharge of product gases.

3. The method of claim 1 in which the liquid sulfur input to the system after interrupting input of feedstock sulfur-reducing gas is controlled to avoid condensation of sulfur vapor in such reaction vessel means.

4. The method of claim 1 in which heat input to the system through the separately controlled heat source means for the vaporizer and superheater means is controlled to avoid condensation of sulfur vapor in such system.

5. The method of claims 1 or 2 further including the step of interrupting introduction of liquid sulfur.

6. The method of claim 5 further including the step after interrupting introduction of liquid sulfur of quantitatively increasing input of steam to the system through such vaporizer and superheater means to maintain system temperatures at such selected level related to system temperatures maintained during production of hydrogen sulfide.

7. The method of claim 6 in which quantitative input of steam to such system made through the vaporizer and superheater means is at a level to maintain system heat balance.

8. The method of claim 7 in which steam input through the vaporizer and superheater means is supplemented with liquid sulfur during changeover from such standby condition to a hydrogen sulfide producing condition.

* * * * *

UNITED STATES PATENT AND TRADEMARK OFFICE
CERTIFICATE OF CORRECTION

PATENT NO. : 4,404,180

DATED : September 13, 1983

INVENTOR(S) : Ian Drum, Richard S. Madenburg, Douglas M. Paulsrude, Carroll H. Sherman, Frank G. Turpin, Gerry A. Wheatcroft It is certified that error appears in the above-identified patent and that said Letters Patent are hereby corrected as shown below:

Column 4, line 51, "pressure" should read --pressures--.

Column 5, line 50, "cook" should read --cool--.

Column 9, line 3 of table beginning at line 55, "in" should read --In--.

Column 11, line 6, exchanges" should read --exchangers--.

Signed and Sealed this

Twenty-seventh Day of December 1983

[SEAL]

Attest:

GERALD J. MOSSINGHOFF

Attesting Officer   Commissioner of Patents and Trademarks